Patented May 28, 1935

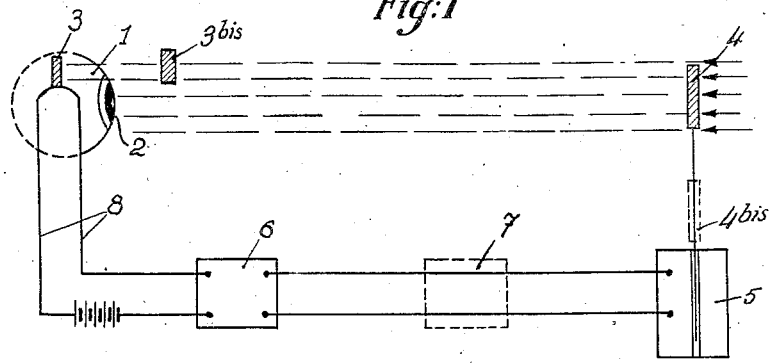
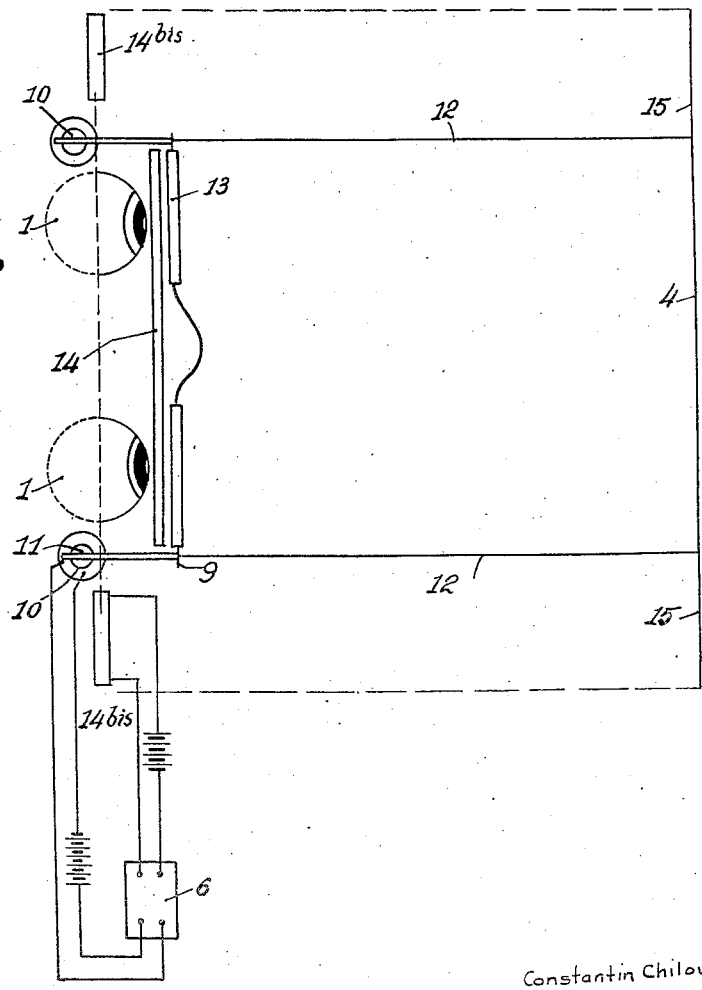

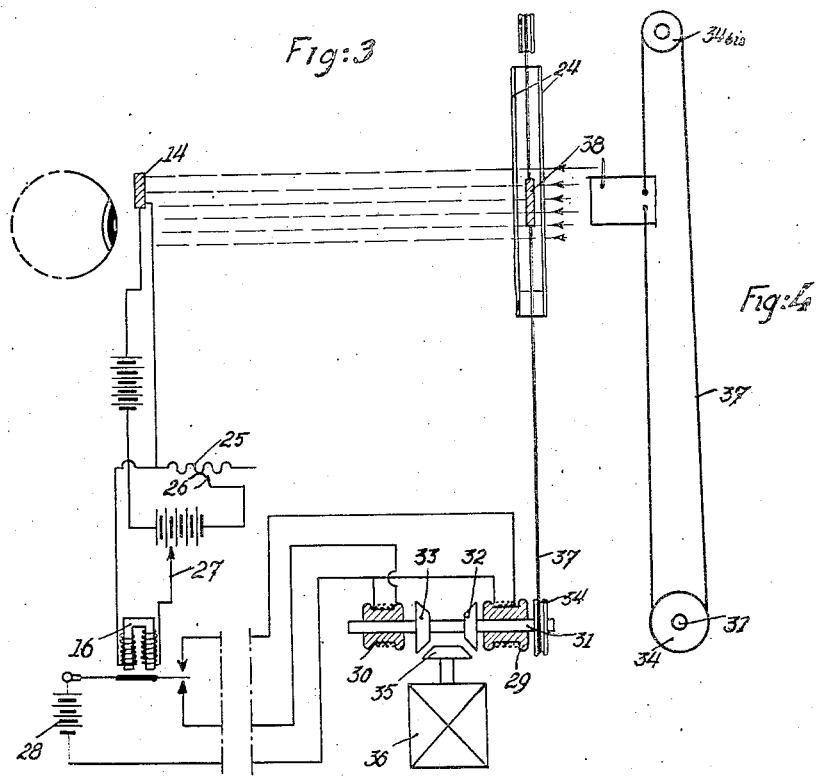
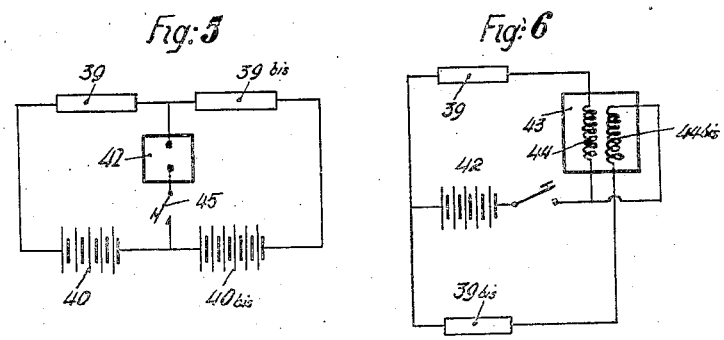

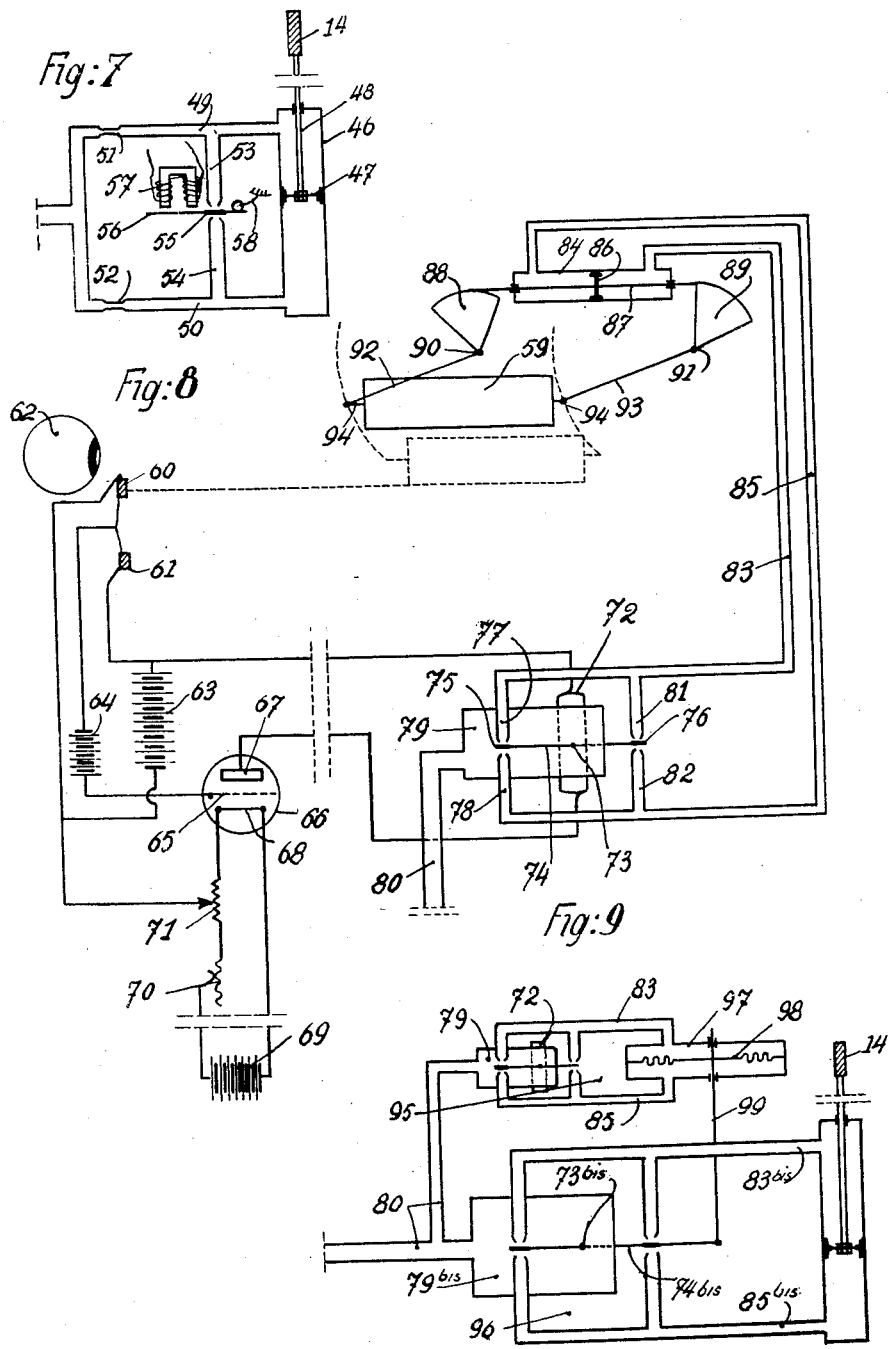

2,003,248

UNITED STATES PATENT OFFICE 2,003,248

IMPROVEMENTS IN CONTROL OF GLARE SHIELDS OF VEHICLES

Constantin Chilowsky, Paris, France

Application July 27, 1932, Serial No. 625,173. Renewed May 2, 1935. In Germany August 7, 1931

9 Claims. (Cl. 296—97)

The present invention relates to a method and apparatus for protecting the eyes of a motor car driver against the blinding effect of illuminants, and chiefly of the headlights of a vehicle coming in the other direction, in which the electric current which passes through one or more photoelectric cells, acts upon the controllng device of a protecting screen, which may thus be placed in front of the eyes to be protected. The photoelectric cells consist of cells of variable resistance, such as selenium cells, or of cells containing alkali metals, oxides of copper, etc.

The method according to the invention differs from the known methods by the following characteristics. A photo-electric cell is situated in a region in which the protecting screen, when lighted by a source of blinding light, will cast a shadow, and the screen, under the effect of the variable electric current which is produced in the cell, is enabled to move and to maintain itself in a continuous series of protecting positions.

For this reason there will be an equilibrium at each instant between the action of the variations of the electric current flowing in the cell, upon the movements of the screen, and the action of the movements of the screen upon the lighting of the cell and hence upon the current flowing through the latter.

The advantages offered by the method of protection, the subject matter of the invention, consist in the fact that it enables the use of a relatively narrow screen which upon encountering a second motor vehicle will be automatically displaced in such manner as to constantly remain between the driver's eyes and the blinding headlights, during the whole time of meeting of the two vehicles, and irrespectively of the relative motion of the vehicles and the jolting upon the road.

Thus the use of the small movable screen will obviate all the drawbacks inherent in the known devices of this class. In such devices, in fact, the screen must have a large size, for in order to be effective it must cover the whole extent of the field of the eyes to be protected which the different positions of the opposite vehicle, and hence it must cut off or darken the whole extent of the road in view, and this is a source of serious danger.

In my said method, the photo-electric cell which is preferably situated about on a level with the eyes, will in practice be located somewhat above or below this level, in order that the shadow cast by the screen in the positions in which it protects the eyes, is at the same time cast, at least partially, upon the cell.

The photo-electric cell is mounted somewhat above the eyes, if the inoperative position of the screen is at a lower point, or somewhat below the eyes if this inoperative position is at an upper point.

The cell may be attached to the driver's head or body by suitable means, but it may also be mounted on the vehicle, in which case its support is made adjustable in any manner, so that the driver may place it next his head and on a level with his eyes when taking his position in the vehicle.

The screen may consist of a light band, either opaque or translucent, and in the latter case the driver can still observe the headlights of the other vehicle. It will have for instance the form of a narrow band of a centimeter or more in width, according to its distance from the eyes and the degree of protection to be obtained. The screen may be mounted, together with its controlling means, upon the driver's head, but it is preferably mounted on the vehicle.

The said band should have the horizontal position, and will thus move in a vertical plane, from top to bottom and inversely. The screen may also consist of one or two vertical bands, having a horizontal movement, or it may be given two movements at the same time, one horizontal and the other vertical, under the action of two cells which control, in any suitable manner, the two sets of devices for the displacement of the screen, and herein the size of the screen can be reduced to the minimum in the vertical and the horizontal directions, and may take the form of two small opaque screens having the size of goggle glasses, protecting the right and left eye respectively. The photo-electric cells controlling the horizontal motion of the screen are obviously situated adjacent the eyes.

Since the light from the headlights will differ considerably when the vehicle is approaching and as it is necessary that the apparatus shall be sufficiently sensitive to provide for the movement of the screen even when the approaching vehicle is at some distance, it may happen that when the two vehicles are very close together, the diffused light, such as the light diffused by the wind screen, may light the cell sufficiently, in spite of the shadow cast by the screen, to cause the movement of the latter, which thus passes beyond its protected position.

To obviate this drawback, two cells may be provided, whereof one is mounted as above disclosed, i. e., in a region in which the screen may cast a shadow, and the other is mounted in such manner that it will be constantly lighted by the source of the blinding light; the means controlling the screen are subjected to an electro-magnetic or electro-dynamic action due to the difference between the current flowing in the two cells, the characteristics of the cells being made such that the screen will remain in equilibrium in its protecting position when one of the cells is partially covered by its shadow.

This differential arrangement provides for an approved operation, even with a very small quantity of incident light, that is, for a great distance between the two vehicles on the road, and on the other hand for a short distance and a large quantity of light.

The control of the motion of the screen by the current in the cells is effected by a relay device and servo-motor. Use may be made of a servo-motor of the electric type, but it is preferable to employ a pneumatic servo-motor, making use of the partial vacuum of the engine. The current from the cells may be amplified by a three-electrode valve or by a current relay. If the current is not amplified, the cells must be of large size, but when it is amplified, smaller cells can be used. In both cases, in order to make the apparatus more sensitive, the light may be condensed upon the cell by means of a condensing lens or a concave mirror.

The following description, with reference to the accompanying drawings which are given by way of example, shows various embodiments of the invention.

Fig. 1 is a general view relating to the method. Fig. 2 is a plan view showing an arrangement in which the screen is attached to the driver's head. Fig. 3 shows the use of an electric servo-motor, and Fig. 4 is a corresponding side view. Figs. 5 and 6 show a differential circuit containing the cells. Fig. 7 relates to a pneumatic servo-motor. Fig. 8 is a complete arrangement comprising a three-electrode valve and a pneumatic servo-motor. Fig. 9 shows another form of the pneumatic servo-motor.

In the arrangement shown in Fig. 1, the eye of a motor car driver is shown at 1; 2 is the pupil, and 3 the photo-electric cell. The movable screen 4 is situated in front of the eyes, and between the latter and the source of light which is to be cut off; 5 indicates an electro-magnetic or electro-dynamic device of any kind, adapted to displace the movable screen 4 in the vertical plane, 6 is an amplifier containing valves or the like, whose use is optional and which serves to amplify the current from the cell 3 to such degree that it will actuate the device 5. A relay 7 may be combined with the amplifier 6; the current from the cell 3, amplified at 6, acts upon the relay 7 which in turn controls the device 5. If desired, the latter may be actuated directly by the cell 3.

The operation is as follows.

At the start, the screen 4 is in the lower position 4 bis. When the light from a vehicle headlight falls upon the cell 3, the current increases in the circuit 8, thus acting through the devices 6—7 upon the device 5, whereby the screen will be raised into the position 4. When the said screen comes into the position in which its shadow commences to cover the cell 3, the current is reduced in the circuit 8, and the rising movement becomes slower. The screen finally tends to stop, oscillating about a position of equilibrium in which its shadow protects the eyes and a part of the cell 3 at the same time. This latter is preferably situated at the level of the eyes, but it may be located at 3 bis, or somewhat in front of the eyes and just above the pupils. In this latter case, the cell may have the form of a long and narrow rod, which might be secured to a device resembling a pair of goggles.

In the arrangement shown in Fig. 2, the eyes 1 are to be protected by a movable screen 4 which is mounted upon two lateral branches 12 adapted to turn upon a pivot axle 9 secured to a goggle device 13. To the end 11 of each branch 12 is pivoted a core of a solenoid 10 adapted to raise the screen 4. The photo-electric cell 14, which may have an elongated form, is located close to the pupil, as observed in the figure, and in this case it is preferably secured to the driver's head, or in a modified construction, it is divided into two cells 14 bis, which are situated upon an imaginary line passing through both eyes, and herein the movable screen 4 is extended at both sides at 15, to enable its shadow to be cast upon the cells 14 bis. The cells act upon the solenoid 10, through an amplifier or a relay 6.

Fig. 3 shows another modification, in which the screen is secured to the vehicle. The cell 14 acts through the relay 16 in order to connect in the circuit of the battery 28, according as the relay 16 is energized or not, one or the other of the electro-magnets 29 or 30. In the two electro-magnets is axially slidable a shaft 31 to which are secured two steel rollers 32—33 and a pulley 34. According as one or the other of the rollers 32—33 is attracted by the corresponding electro-magnet, the other roller will make contact with a third roller 35 driven by an electric motor 36. Due to the said rollers, the shaft 31 will rotate in one or the other direction, depending upon which roller is operative.

A wire 37, shown in Fig. 4, is stretched between the pulley 34 and a second pulley 34 bis, and the screen 38 is secured to this wire. The screen 38 may be contained in a glass case 24. When the relay 16 is energized, the screen 38 is moved vertically in a given direction, and when the relay is de-energized the screen will move in the contrary direction.

In this manner the position of the screen 38 is variable within narrow limits, and the shadow of the screen does not cease to protect the eyes.

The screen 38 may be located at a distance of 15 to 50 cm. from the eyes. It is much preferable to mount it upon the wind screen of the vehicle, which thus forms one face of the glass case containing the screen, and herein the second face of the box can be eliminated. Any suitable guiding device such as stretched wires, may be employed for sufficiently guiding the screen.

Fig. 3 further shows a known arrangement of the cell 14 which serves to compensate the slight current flowing in the cell, even when it is in the shade; and herein the cell forms part of a Wheatstone bridge comprising a variable resistance 25. The slide 26 of the resistance 25 and the slide 27 for the battery voltage are adjusted in such manner as to reduce the current in the cell to a minimum or to zero when it is darkened, in order to prevent this current from acting upon the relay 16.

Fig. 5 shows a differential arrangement of the two cells. The cell 39 is placed in the same conditions as the cells 3 or 14 of the preceding figures, and thus in a region in which the screen may cast a shadow; but the cell 39 bis is located in a region which is constantly lighted by the headlights of an approaching vehicle. The current set up by the electro-motive forces 40—40 bis will flow through the respective cells 39—39 bis, and it is only their difference that affects the relay 41, which is analogous to the relays 6 and 16 shown in the preceding figures. The electro-motive forces 40 and the characteristics of the cells 39 are made such that the relay 41, and hence the screen which it controls, will be in equilibrium when the cell 39 is partially illuminated.

Fig. 6 shows a second differential circuit containing the cells 39 and 39 bis; herein both cells are supplied by a single electro-motive force 42, but the currents in each cell pass through a distinct winding of the relay 43. The two windings 44—44 bis of this relay are so arranged as to afford electromagnetic actions in contrary directions upon the movable part (not shown) of the relay 43. Hence only the difference between the currents flowing through the two cells will act upon the said movable part, and it is this difference which controls the movements of the screen.

With such a differential circuit which is arranged for a very sensitive action, thus moving the screen by a very slight difference in the lighting of the cells, it is preferable to use in the circuit of the cells a switch 45 mounted within reach of the driver, for instance upon the steering wheel, thus placing the cells in the circuit only when the blinding effect is likely to occur. The switch might be mounted in the circuit of the electromagnets of the various relays of the servo-motors, and this represents a great saving of current.

Fig. 7 shows by way of example an arrangement for the pneumatic control of the screen 14, comprising a cylinder 46 and a piston 47, the piston rod 48 being connected with the screen 14. The two parts of the cylinder are connected, by conduits 49—50, restricted at 51—52, with a source of pressure which is different from atmospheric pressure, for instance with the partial vacuum at the suction end of the engine. Two branches 53—54 of said conduits afford outlets open to atmosphere, these being opposite one another, and between the two outlets is located a plate 55 pivotally mounted on an axle 56. The electromagnet 57 carrying the current is affected by the photo-electric cell, and the said plate is provided with a reaction spring 58. When the plate tends to close off the branch conduit 53. The upper face of the piston 47 is subjected to the vacuum of the engine, whilst the lower face is subjected to atmospheric pressure, and thus the piston 47 and the screen 14 will rise; but when the said plate descends and closes off the conduit 54, the piston and screen will descend.

Fig. 8 shows a complete circuit for amplifying by electric means, further comprising a pneumatic servo-motor.

For the sake of clearness, the screen 59 and its controlling means, which in reality are situated in a plane perpendicular to the plane of the figure, are represented as in this latter plane. The two photo-electric cells 60—61 are mounted as above set forth, and it is only the difference between the currents carried by the cells that is employed for the control of the screen 59. The cell 60 is on a somewhat lower level than the eye 62 to be protected; the cell 61 has a much lower position, in a region in which the screen will not cast a shadow. The two cells are connected in series with a battery 63, a battery 64, whose current has the opposite direction, is connected at one end with a point on the circuit situated between the cells 60 and 61, and at the other end with the grid 65 of a valve 66, and if this battery is properly arranged, the potential of the grid can be brought to zero for a given ratio between the resistances of the two photo-electric cells, these latter having such nature that when they are both given the same illumination, the ratio between the resistances will vary, and thus the potential of the grid will differ from zero, so that an amplified current will flow in the circuit of the plate 67 of the valve 66. The filament 68 of the valve is heated by the battery (giving 6 to 12 volts) of the vehicle, and the two rheostats 70—71 are comprised in the circuit of the filament 68. The amplified current of the plate circuit passes through a pivoting coil 72 situated in a magnetic field produced by any kind of magnet, not shown. The coil 72, which moves under the effect of the current which it carries, and hence under the influence of the lighting of the photo-electric cells, is secured to the shaft 73 of a valve arm 74 carrying two valve discs 75—76; the disc 75 is movable between the ends of two conduits 77—78 opening into a chamber 79 which is connected by a conduit 80 with the suction end of the engine; the disc 76 is movable between the ends of two conduits 81—82 opening into the atmosphere. The disc 75 is mounted on the arm 74 in the position within the said chamber, and the disc 76 is situated outside of the said chamber.

The conduits 77—81 are connected by a conduit 83 with one end of a cylinder 84, and the conduits 78—82 are connected by a conduit 85 with the other end of the cylinder. This latter contains a piston 86. If the valve arm 74 turns in the clockwise direction, the left hand end of the cylinder will be connected with the suction end of the engine and the right hand end with the atmosphere, and thus the piston will move to the left; if the valve arm turns in the other direction, the piston moves to the right. The said valve device comprising two discs, as compared with the valve having only one disc (Fig. 7), has the advantage of being pneumatically balanced, as it is constantly subjected to two equal forces having the same direction, whose resultants pass through the axis 73 and have no effect upon its motion.

A wire 86 is attached to the piston, and its ends are secured to two respective sectors, pivotally mounted upon two axles 90—91; said sectors are secured to respective rods 92—93, pivoted at the ends to the frame of the screen 59, and thus when the piston moves to the left, the screen will descend into the position shown by the dotted lines, in which it protects the eye 62, and its shadow falls upon a part of the cell 60.

The cylinder 84 and the device consisting of the sectors and pivoted rods is mounted on the vehicle body, and for instance above the wind screen.

The valve amplifying arrangement may be entirely eliminated, and the differential current from the photo-electric cells will now proceed through the movable coil 72.

Fig. 9 relates to the combined use of two pneumatic devices 95 and 96 which are analogous to those indicated in Fig. 8.

In the device 95, the conduits 83—85 are connected with a chamber 97 containing a movable corrugated diaphragm 98, whose motion is imparted to the valve 74 bis of the device 96 by means of a rod 99. In the devices 95 and 96, the same reference numerals indicate like parts as shown in Fig. 8, the indication "bis" being added to the numerals of the device 96.

The above-mentioned pneumatic devices are in fact devices for pneumatic amplifying, and by the use of the combination of two such devices as shown in Fig. 9, an electric amplifying can be dispensed with. On the other hand, the pneumatic method for amplifying small movements may be employed for other purposes than the ones herein described.

The pneumatic servo-motors as disclosed are more advantageous than electric servo-motors as they will attain positions of equilibrium without subjecting the screen to continual oscillations.

A pneumatic device may be employed when the screen is mounted on the driver's head. In Fig. 2, the cores of solenoid 10 may be replaced by very small vertical cylinders and pistons, the device 6 being supposed to be a pneumatic controlling device as disclosed in Figs. 7, 8, and 9.

Among the electric devices, those which are termed electro-dynamic, that is, devices with movable coils, which may be substituted for the electro-magnets shown in the figures for the sake of simplicity, have an advantage as compared with the electromagnet device, due to the absence of residual magnetism.

Any other pneumatic or electric servo-motor device may be used, such as the electric servo-motors comprising a ratchet wheel operated by a vibratory movement which is produced by an electromagnet.

Obviously, the several arrangements herein described are given solely by way of example, and in no wise limit the scope of the invention.

What I claim is:

1. A method for protecting the eyes of a motor vehicle driver from the blinding action of illuminants such as the headlights of an approaching vehicle, which consists in mounting in the motor vehicle at least one photo-electric cell which is exposed to the blinding light, in providing a movable protecting screen in the form of a narrow strip and adapted to take position in front of the driver's eyes, mechanical means for moving the screen, an electrical connection between the photo-electric cell and the means for moving the screen, in disposing the photo-electric cell behind the screen in such a manner that the screen casts a shadow upon a part of the photo-electric cell when said screen casts a shadow upon the driver's eyes, the variations of current in the photo-electric cell according to the blinding light and the shadow cast by the screen acting on the means for moving the screen.

2. A method for protecting the eyes of a motor vehicle driver from the blinding action of illuminants such as the headlights of an approaching vehicle, which consists in mounting in the motor vehicle, substantially at the level of the driver's eyes, at least one photo-electric cell which is exposed to the blinding light, in providing a movable protecting screen in the form of a narrow strip and adapted to take position in front of the driver's eyes, mechanical means for moving the screen, an electrical connection between the photo-electric cell and the means for moving the screen, in disposing the photo-electric cell behind the screen in such a manner that the screen casts a shadow upon a part of the photo-electric cell, when said screen casts a shadow upon the driver's eyes, the variations of current in the photo-electric cell according to the blinding light and the shadow cast by the screen acting on the means for moving the screen.

3. A method for protecting the eyes of a motor vehicle driver from the blinding action of illuminants such as the headlights of an approaching vehicle, which consists in mounting in the motor vehicle at least one photo-electric cell secured to said vehicle and whose position can be so adjusted that it will be located substantially at the level of the driver's eyes and which is exposed to the blinding light, in providing a movable protecting screen in the form of a narrow strip and adapted to take position in front of the driver's eyes, mechanical means for moving the screen, an electrical connection between the photo-electric cell and the means for moving the screen, in disposing the photo-electric cell behind the screen in such a manner that the screen casts a shadow upon a part of the photo-electric cell, when said screen casts a shadow upon the driver's eyes, the variations of current in the photo-electric cell according to the blinding light and to the shadow cast by the screen acting on the means for moving the screen.

4. A method for protecting the eyes of a motor vehicle driver from the blinding action of illuminants such as the headlights of an approaching vehicle, which consists in mounting in the motor vehicle at least one photo-electric cell which is exposed to the blinding light, in providing a movable protecting screen adapted to take position in front of the driver's eyes, mechanical means for moving the screen, a servo-motor adapted to act upon said means, an electrical connection including a source of energy between the photo-electric cell and the servo-motor, in disposing the photo-electric cell behind the screen in such a manner that the screen casts a shadow upon a part of the photo-electric cell when said screen casts a shadow upon the driver's eyes, the variations of current in the photo-electric cell according to the blinding light and to the shadow cast by the screen acting on the servo-motor.

5. A method for protecting the eyes of a motor vehicle driver from the blinding action of illuminants such as the headlights of an approaching vehicle, which consists in mounting in the motor vehicle at least one photo-electric cell which is exposed to the blinding light, in providing a movable protecting screen adapted to take position in front of the driver's eyes, mechanical means for moving the screen, a pneumatic servo-motor which is actuated by the vacuum of the engine and adapted for acting upon these mechanical means, the valve arm of said servo-motor being acted upon by an electro-dynamic device, an electrical connection including a source of energy between the photo-electric cell and the electro-dynamic device, in disposing the photo-electric cell behind the screen in such a manner that the screen casts a shadow upon a part of the photo-electric cell when said screen casts a shadow upon the driver's eyes, the variations of current in the photo-electric cell according to the blinding light and to the shadow cast by the screen acting on the servo-motor.

6. A method for protecting the eyes of a motor vehicle driver from the blinding action of illuminants such as the headlights of an approaching vehicle, which consists in mounting in the motor vehicle two photo-electric cells whereof one is located in such a manner that it will be constantly exposed to the blinding light, in providing a movable protecting screen adapted to take a position in front of the driver's eyes, means for moving the screen, an electrical connection between the two photo-electric cells and the means for moving the screen, the other photo-electric cell being situated behind the screen and so situated that the screen may cast a shadow upon this cell, means being provided in the electrical connection whereby the differences in the current carried by the two photo-electric cells will cause the displacement of the said protecting screen.

7. An apparatus for protecting the eyes of a motor vehicle driver from the blinding action of illuminants such as the headlights of an approaching vehicle, comprising a movable protecting screen in the form of a narrow strip and adapted to take a position in front of the driver's eyes, mechanical means to move the screen, at least one photo-electric cell which is exposed to the action of the blinding light and disposed behind the screen in order that the screen casts a shadow upon the photo-electric cell when said screen casts a shadow upon the driver's eyes, an electric circuit comprising the photo-electric cell, and means whereby the variations of current in the photo-electric cell will act upon the mechanical means to move the screen.

8. An apparatus for protecting the eyes of a motor vehicle driver from the blinding action of illuminants such as the headlights of an approaching vehicle, comprising a movable protecting screen adapted to take a position in front of the driver's eyes, mechanical means to move the screen, at least one photo-electric cell which is exposed to the action of the blinding light and disposed behind the screen in order that the screen casts a shadow upon the photo-electric cell when said screen casts a shadow upon the driver's eyes, an electric circuit comprising the photo-electric cell, means in said circuit for amplifying the variations of current produced in the photo-electric cell, a pneumatic servo-motor operated by the vacuum of the engine and comprising a valve arm, means whereby the amplified variations of current act upon this valve arm, and a connection between the pneumatic servo-motor and the mechanical means to move the screen.

9. An apparatus for protecting the eyes of a motor vehicle driver from the blinding action of illuminants such as the head-lights of an approaching vehicle, comprising two photo-electric cells whereof one is adapted to be constantly exposed to the blinding action and the other is situated substantially at the level of the driver's eyes, a protecting screen adapted to cast a shadow upon the driver's eyes and upon a portion of the photo-electric cell which is on a level with the same, two electric circuits connecting together the two cells and connected with a three-electrode valve in such manner that the differential action of the two electric circuits under the effect of the variations of luminous intensity will vary the potential of the valve grid, an electro-dynamic device comprised in the plate circuit of the said valve and movable according to the variations of the current in the circuit, a pneumatic servo-motor operated by the suction of the motor of the vehicle and comprising a valve arm connected with said electro-dynamic device comprised in the plate circuit of the three-electrode valve, a piston movable in a cylinder, said cylinder being connected with a chamber in which the valve arm controls the suction of the motor of the vehicle, pivoting rods and sectors adapted to connect the said piston with said protecting screen and to effect the displacement of said screen according to the action of the servo-motor.

CONSTANTIN CHILOWSKY